(12) United States Patent
Maki et al.

(10) Patent No.: US 7,691,362 B2
(45) Date of Patent: Apr. 6, 2010

(54) METHOD FOR PRODUCING AN α-ALUMINA POWER

(75) Inventors: Hajime Maki, Niihama (JP); Yoshiaki Takeuchi, Niihama (JP); Kazuhisa Kajihara, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/211,700

(22) Filed: Aug. 26, 2005

(65) Prior Publication Data

US 2006/0073093 A1 Apr. 6, 2006

(30) Foreign Application Priority Data

Sep. 3, 2004 (JP) ............... 2004-256676
Jan. 5, 2005 (JP) ............... 2005-000527

(51) Int. Cl.
 *C01F 7/02* (2006.01)
(52) U.S. Cl. .................................... 423/625
(58) Field of Classification Search ............ 423/625
 See application file for complete search history.

(56) References Cited

U.S. PATENT DOCUMENTS

| 4,657,754 | A | 4/1987 | Bauer et al. | |
| 5,641,469 | A * | 6/1997 | Garg et al. | 423/625 |
| 2003/0098529 | A1* | 5/2003 | Drumm et al. | 264/624 |
| 2003/0185746 | A1 | 10/2003 | Kajihara et al. | |
| 2005/0214201 | A1* | 9/2005 | Maruno et al. | 423/625 |

FOREIGN PATENT DOCUMENTS

| EP | 1262457 | * 12/2002 |
| WO | WO 00/69790 A2 | 11/2000 |

OTHER PUBLICATIONS

Grant & Hackh's Chemical Dictionary, Fifth Ed., p. 371, 1987.*
Taichi Sato, "Aluminium Hydroxides and Aluminas", *Mineraology Association Magazine*, vol. 19, No. 1, Mar. 1989, pp. 21-41, with English Abstract.
A. Krell et al., "Nanocorundum—Advanced Synthesis and Processing", *NonoStructured Materials*, vol. 11, No. 8, 1999, pp. 1141-1153.
S. Rajendran et al., "Fabrication of a Fine Grained Alumina Ceramic", *Key Engineering Materials*, vols. 53-55, 1991, pp. 462-468.
B. Felde et al., "Synthesis of Ultrafine Alumina Powder by Sol-Gel Techniques", 9$^{th}$ Cimtec World Ceramics Congress, Ceramics: Getting into the 2000's—Part B, P. Vincenzini (Editor), 1999, pp. 49-56.
Y. Ye et al., "Preparation of Ultrafine α-$Al_2O_3$ Powder by Thermal Decomposition of AACH at Low Temperature", *The Chinese Journal of Process Engineering*, vol. 2, No. 4, Aug. 2002, pp. 325-329.

* cited by examiner

*Primary Examiner*—Steven Bos
(74) *Attorney, Agent, or Firm*—Sughrue Mion, PLLC

(57) ABSTRACT

A method for producing an α-alumina powder is provided. T method for producing an α-alumina powder comprising steps of:
(1) pulverizing a metal compound having a full width at half maximum (Ho) of a main peak in XRD pattern to obtain a seed crystal having a full width at half maximum (H) of the main peak in XRD pattern in the presence of pulverizing agent,
(2) mixing the obtained seed crystal with an aluminum salt,
(3) calcining the mixture, and
 wherein a ratio of H/Ho is 1.06 or more.

12 Claims, 1 Drawing Sheet

Full width at half maximum Ho of a metal compound

Full width at half maximum H of a seed crystal

METHOD FOR PRODUCING AN α-ALUMINA POWER

FIELD OF THE INVENTION

The present invention relates to a method for producing an α-alumina powder having a high α-ratio and large BET specific surface area.

DESCRIPTION OF RELATED ART

α-alumina is one of aluminum oxides, which is represented by formula $Al_2O_3$ and has a corundum structure, and widely used as a raw material for producing a sintered body such as a translucent tube.

From the standpoint of improvement in the strength of a sintered body, α-alumina used as a raw material is required to have a high α-ratio and large BET specific surface area.

SUMMARY OF THE INVENTION

The present inventors have investigated a method for producing an α-alumina powder, resultantly leading to completion of the present invention.

Namely, the present invention provides a method for producing an α-alumina powder comprising steps of:
 (1) pulverizing a metal compound having a full width at half maximum (hereinafter abbreviated to "FWHM") (Ho) of a main peak in X-ray diffraction (hereinafter abbreviated to "XRD") pattern to obtain a seed crystal having FWHM (H) of the main peak in XRD pattern in the presence of pulverizing agent,
 (2) mixing the obtained seed crystal with an aluminum salt,
 (3) calcining the mixture, and
 wherein a ratio of H/Ho is 1.06 or more.

DETAILED DESCRIPTION OF THE PREFERRED EMBODIMENTS

Figure 1:
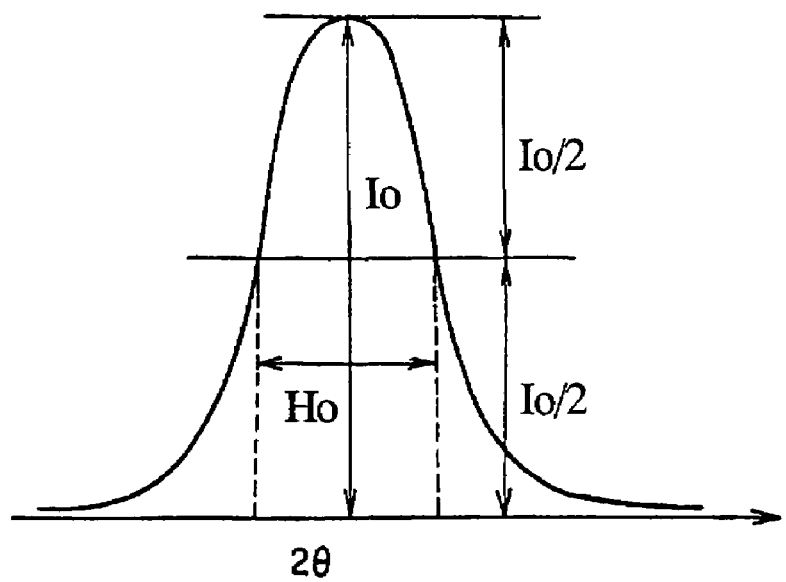
FIG. 1 shows a method to calculate FWHM Ho of a metal compound and FWHM H of a seed crystal.
Figure 1:
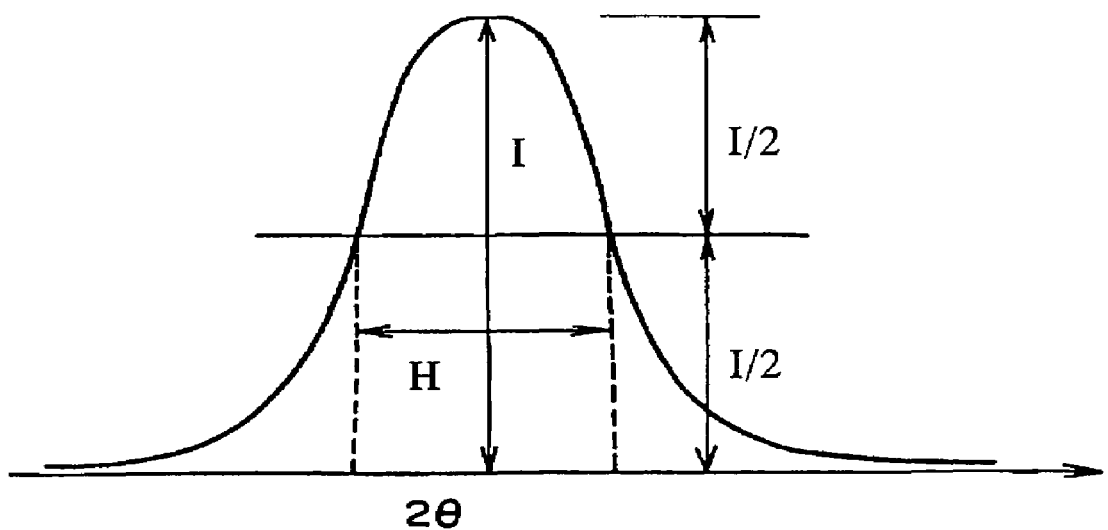

The method for producing an α-alumina powder of the present invention comprises a step (1) of pulverizing a metal compound having a FWHM(Ho) of a main peak in XRD pattern to obtain a seed crystal having FWHM (H) of the main peak in XRD pattern.

The metal compound may advantageously be that promoting phase transformation from an aluminum compound into α-alumina in calcination described later. Examples of the metal compounds include metal oxides such as α-alumina ($Al_2O_3$), α-iron oxide($Fe_2O_3$) and α-chromium oxide ($Cr_2O_3$); metal hydroxides such as diaspore (AlOOH), preferably metal oxides, and further preferably α-alumina.

Pulverizing is conducted in the presence of pulverizing agent.

The pulverizing agent may advantageously be that promoting an efficiency of pulverizing. Examples of the pulverizing agent include alcohols such as ethanol, propanol; glycols such as ethylene glycol (molecular weight [mw]: 62, boiling point [bp]: 197.2° C.), polyethylene glycol, propylene glycol (mw: 76, bp: 187.4° C.) polypropylene glycol (mw: 134, bp: 231.8° C., in case of dipropylene glycol), 1,3-butylene glycol (mw: 90, bp: 207.5° C.), 1,4-butylene glycol (mw: 90, bp: 235° C.); amines such as triethanol amine; fatty acids such as palmitic acid, stearic acid and oleic acid; metal alkoxides such as aluminum alkoxide; carbon materials such as carbon black and graphite, preferably glycols, more preferably glycols having a MW of from 50 to 300 and boiling point of from 150° C. to 300° C., further preferably polypropylene glycol. The pulverizing agent may be used independently or two or more of them may be used in combination. The amount of the pulverizing agent is usually about 0.01 parts by weight or more, preferably about 0.5 parts by weight or more, further preferably about 0.75 parts by weight or more and usually about 10 parts by weight or less, preferably about 5 parts by weight or less, further preferably 2 parts by weight or less based on 100 parts by weight of the metal compound.

When conducted in the presence of water, pulverizing may be conducted further in the presence of dispersant or surfactant. Examples of the dispersant include acids such as nitric acid, hydrochloric acid, sulfuric acid, acetic acid and oxalic acid; alcohols such as methanol, ethanol, isopropyl alcohol; aluminum salts such as aluminum nitrate, aluminum chloride, aluminum oxalate and aluminum acetate. Examples of the surfactant include anionic surfactants, cationic surfactants, nonionic surfactants and amphoteric surfactants.

Pulverizing may be conducted in batch-wise or continuous process. Pulverizing may advantageously be conducted, for example, by using a pulverizer such as ball mill, vibration mill, planetary mill, pin mill, medium-agitating mill and jet mill. In pulverizing, it is preferable to decrease contamination, and for this, it is recommended to use alumina, preferably alumina having a purity of 99% by weight or more as the material of member, which is contacted with the aluminum compound, such as pulverizing medium, vessel, nozzle and liner.

Further, the seed crystal obtained by pulverizing may be classified. By classification, 50% by weight or more, preferably 70% by weight or more, further preferably 90% by weight or more of coarse particles (for example, particles with a particle diameter of about 1 μm or more) may be removed from the seed crystal.

The seed crystal obtained in the above method has an average primary particle diameter of usually about 0.01 μm or more, preferably about 0.05 μm or more, and usually about 0.5 μm or less. The seed crystal has a BET specific surface area of usually about 12 m$^2$/g or more, preferably about 15 m$^2$/g or more, and usually about 150 m$^2$/g or less.

Pulverizing is conducted under conditions which change a metal compound having FWHM of Ho into a metal compound having FWHM of H, wherein the ratio of H to Ho is about 1.06 or more, preferably about 1.08 or more, and usually about 5 or less, preferably about 4 or less, further preferably about 3 or less. The ratio of H/Ho represents a degree of pulverizing, and is calculated from FWHM(Ho) of a main peak between 45 degrees and 70 degrees in XRD pattern measure before pulverizing and FWHM(H) of the main peak in XRD pattern measured after pulverizing as shown in FIG. 1.

When a metal compound is α-alumina and X-ray source is CuK α beam, the ratio of H/Ho represents may be calculated from FWHM(Ho) of alumina(116) diffraction peak observed at 2θ of about 57.5 degree, in XRD pattern before pulverizing, and FWHM(H) of the alumina(116) diffraction peak in XRD pattern after pulverizing.

Regarding α-iron oxide($Fe_2O_3$), α-chromium oxide ($Cr_2O_3$) or diaspore(AlOOH), a main peak thereof between 45 degrees and 70 degrees, which is usually a peak of (116), is observed at near position to that of α-alumina in XRD pattern measured using CuKα beam as X-ray source.

The method of the present invention comprises further a step (2) of mixing the obtained seed crystal with an aluminum salt.

The aluminum salt may be a compound converting into α-alumina by calcination described later, and examples thereof include an aluminum inorganic salt such as aluminum nitrate, aluminum sulfate, aluminum ammonium sulfate and ammonium aluminum carbonate hydroxide; and an aluminum organic salt such as aluminum oxalate, aluminum acetate, aluminum stearate, aluminum lactate and aluminum laurate, and preferably an aluminum inorganic salt, further preferably aluminum nitrate.

Mixing in step (2) may be conducted by using a ball mill, vessel with agitator and the like.

Mixing may be advantageously conducted, for example, by a method in which an aluminum salt is added to a solvent to obtain a solution or slurry, a seed crystal is added to this, and then, the solvent is removed. By the above-mentioned mixing, an aluminum salt in which seed crystals are uniformly dispersed is obtained.

In mixing, a seed crystal may be dispersed in a solvent before adding to the above-mentioned solution or slurry, and then, the solvent is removed.

Further, mixing may be conducted also by a method in which a seed crystal is added to an aluminum salt, and the mixture is stirred. Stirring may be advantageously conducted by using an apparatus such as a vertical granulator and Henschel mixer. In this mixing, a seed crystal may be dispersed in a solvent before addition to the above-mentioned aluminum salt, and then, the solvent is removed.

The amount of the seed crystal is usually about 1 parts by weight or more, preferably about 2 parts by weight or more, further preferably about 4 parts by weight or more and usually about 50 parts by weight or less, preferably about 40 parts by weight or less, further preferably 30 parts by weight or more based on 100 parts by weight of the total amount of the seed crystal and the aluminum salt.

The obtained mixture may further be subjected to drying. Drying may be conducted at temperature of usually about 100° C. or less by using freeze dryer, vacuum dryer or the like.

The method of the present invention comprises further a step (3) of calcining the mixture obtained above.

The calcination may advantageously be conducted by using an apparatus such as a tubular electric furnace, box-type electric furnace, tunnel furnace, far-infrared furnace, microwave furnace, shaft furnace, reflection furnace, rotary furnace and Roller Hearth furnace. The calcination may be conducted in batch-wise or continuous. It may be conducted in static mode or flow mode.

The calcination temperature is not lower than the temperature at which the aluminum salt transforms to an α-alumina, usually 600° C. or higher, preferably about 700° C. or higher and usually about 1000° C. or lower, preferably about 950° C. or lower. The calcination time is usually 10 minutes or more, preferably about 30 minutes or more and usually about 24 hours or less, preferably about 10 hours or less.

The calcination is usually conducted under air or an inert gas such as $N_2$ and Ar. The calcination may also be conducted under air having controlled partial pressure of water vapor, for example, air having a partial pressure of water vapor of 600 Pa or less.

The obtained α-alumina powder may be subjected to pulverizing. The pulverizing may be conducted, for example, by using a medium pulverizer such as a vibration mill and a ball mill, or an pneumatic pulverizer such as a jet mill. Further, the α-alumina powder may be subjected to classification.

An α-alumina powder obtained by the method of the present invention has an average particle diameter of usually about 0.01 μm or more, preferably about 0.05 μm or more, and usually about 1 μm or less, preferably about 0.1 μm or less, α-ratio is about 90% or more, preferably about 95% or more and BET specific surface area of about 8 $m^2/g$ or more, preferably about 13 $m^2/g$ or more, more preferably about 15 $m^2/g$ or more and about 100 $m^2/g$ or less, preferably about 50 $m^2/g$ or less, more preferably about 30 $m^2/g$ or less.

The α-alumina powder has, as described above, a high α-ratio and large BET specific surface area, therefore, this powder is useful as a raw material for producing an α-alumina sintered body with high strength. The resulted α-alumina sintered body is suitable as a member for which high strength is required such as a cutting tool, bioceramics, low-resistance routing pattern ceramics (for example, alumina ceramics with copper patter thereon) and bulletproof board. The α-alumina sintered body is, due to chemical stability such as excellent corrosion resistance, used as a part of an apparatus for producing a semiconductor such as a wafer handler; an electronic part such as an oxygen sensor; a translucent tube such as a sodium lamp and metal halide lamp; or a ceramic filter. A ceramics filter is used for removal of solid components contained in a exhaust gas, for filtration of aluminum melt, filtration of drinks such as beer, or selective permeation of a gas produced at petroleum processing or $CO$, $CO_2$, $N_2$, $O_2$, $H_2$ gas. The α-alumina powder may be used as a sintering agent for ceramics such as thermally conductive ceramics (for example, AlN), YAG and phosphors.

Further, the α-alumina powder may be used as an additive for toner or resin filler. for improving head cleaning property and friction resistance by addition thereof to an application layer of a magnetic medium of application type. Also, the α-alumina powder may be used as an additive for cosmetics or brake lining.

Furthermore, the α-alumina powder is used as a polishing material. For example, a slurry obtained by dispersing an α-alumina powder in a medium such as water is suitable for polishing of semiconductor CMP and polishing of a hard disk substrate. A polishing tape obtained by coating an α-alumina particle on the surface of a tape is suitable for precise polishing of a hard disk and magnetic head.

EXAMPLES

The present invention is described in more detail by following Examples, which should not be construed as a limitation upon the scope of the present invention. The properties of an α-alumina and a seed crystal were evaluated as follows.

(1) α-Ratio

It is calculated according to the following equation (i) using the peak strength $I_{25.6}$ at 2θ=25.6°, which is corresponding to a peak intensity of α-alumina (012) and the peak strength $I_{46}$ at 2θ=46°, which is corresponding to a peak intensity of alumina other than α-alumina, from a diffraction spectrum measured under conditions of radiation source: CuKα beam, 40 kV×20 mA, monochromator: graphite, by using a powder X-ray diffractometer:

$$\alpha\text{-ratio}=I_{25.6}/(I_{25.6}+I_{46})\times 100(\%) \quad (i)$$

(2) BET Specific Surface Area

It was measured by using specific surface area analyzer (trade name "FLOWSORB II 2300", manufactured by SHIMADZU CORPORATION) with a nitrogen adsorption method.

(3) Average Primary Particle Diameter

From a transmission electro micrograph of α-alumina powder, the maximum diameter along constant direction of each primary particle of any 20 or more particles was measured, and an average value of measured values was calculated.

(4) Degree of Pulverizing

XRD spectrums of the seed crystal (a-alumina) before and after pulverizing operations were measured by a X-ray diffractometer. The full widths at half maximum of a phase (116), i.e. H0(116)(before) and H(116)(after), were obtained from the XRD spectrums, followed by calculation by the equation (ii)

$$\text{Degree of pulverizing} = H(116)/H0(116) \quad \text{(ii)}$$

Example 1

[Preparation of Metal Compound(α-Alumina)]

The aluminum hydroxide was obtained by hydrolyzing an aluminum isopropoxide, followed by pre-calcination to obtain a transition alumina in which the major crystal phase was θ phase and 3% by weight of a phase was contained; the transition alumina was pulverized by a jet mill to obtain a powder having a bulk density of 0.21 g/cm$^3$.

The obtained powder was calcined by a furnace filled with an air of −15° C. of dew point (partial pressure of water vapor: 165 Pa) in the following conditions:

mode: continuous feeding and discharging, average retention time: 3 hours, maximum temperature: 1170° C., then α-alumina having full widths at half maximum of $Ho_{(116)}$, BET specific surface area of 14 m$^3$/g was obtained.

[Pulverization of α-Alumina]

100 parts by weight of the α-alumina and 1 part by weight of a propylene glycol as a pulverizing agent were charged into a vibration mill to pulverize the α-alumina powder in the following conditions:

media: alumina beads having a diameter of 15 mm retention time: 12 hours, consequently, a seed crystal having a full widths at half maximum of $H_{(116)}$ and BET specific surface area of 16.6 m$^3$/g, and average particle diameter of 0.1 μm was obtained. In this example, a degree of pulverizing of $H_{(116)}/Ho_{(116)}$ is 1.1.

[Preparation of Seed Crystal Slurry]

In 80 parts by weight of 0.0001 mole/L aqueous aluminum nitrate solution, 20 parts by weight of the seed crystal dispersed to obtain a slurry. In a ball mill, the slurry and alumina beads having a diameter of 2 mm were charged into, and then agitated. The content of the ball mill was taken out to remove the alumina beads by filtration, then the seed crystal slurry was obtained.

[Mixing of Seed Crystal and Aluminum Salt]

375.13 g (1 mole) of aluminum nitrate nonahydrate (Al (NO$_3$)$_3$.9H$_2$O)(manufactured by Kansai Catalyst Co., Ltd., reagent grade, appearance: powder) was dissolved in water to obtain 1000 cm$^3$ of an aluminum nitrate solution. 100 cm$^3$ of the aluminum nitrate solution was added with 2.83 g of seed crystal described above (0.566 g in terms of Al$_2$O$_3$) to obtain a mixture. Then water was evaporated from the mixture under conditions of 75° C. by using a pressure-reduced drier, to obtain a powder. The amount of the seed crystal in terms of Al$_2$O$_3$ was 10 parts by weight per 100 parts by weight of the powder.

[Calcination]

2.8 g of the powder was charged into an alumina crucible, the alumina crucible was placed in a box-type electric furnace at 25° C. The powder was heated up to 850° C. at a rate of 300° C./h in air, and calcined at 950° C. for 3 hours, to obtain an α-alumina powder. The α-alumina powder has an α-ratio of 95%, BET specific surface area of 15.9 m$^2$/g and average primary particle diameter of 96 nm.

What is claimed is:

1. A method for producing an α-alumina powder comprising the steps of:
   (1) pulverizing a metal compound having a full width at half maximum (Ho) of a main peak in XRD pattern to obtain a seed crystal having a full width at half maximum (H) of the main peak in XRD pattern in the presence of pulverizing agent,
   (2) mixing the obtained seed crystal with an aluminum salt,
   (3) calcining the mixture, and
   wherein the ratio of H/Ho is 1.06 or more,
   wherein the pulverizing agent is at least one selected from the group consisting of ethylene glycol, polyethylene glycol, propylene glycol, polypropylene glycol, 1,3-butylene glycol and 1,4-butylene glycol.

2. The method according to claim 1, wherein the metal compound is at least one selected from the group consisting of metal oxides and metal hydroxides.

3. The method according to claim 2, wherein the metal compound is at least one selected from the group consisting of α-Al$_2$O$_3$, α-Fe$_2$O$_3$, α-Cr$_2$O$_3$ and diaspore.

4. The method according to claim 1, wherein the ratio of H/Ho is 5 or less.

5. The method according to claim 1, wherein the aluminum salt is inorganic aluminum salt.

6. The method according to claim 5, wherein the inorganic aluminum salt is aluminum nitrate.

7. The method according to claim 1, wherein the obtained seed crystal has a BET specific surface area of 12 m$^2$/g or more.

8. The method according to claim 1, wherein amount of the obtained seed crystal is 1 part by weight based on 100 parts by weight of the total amount of the seed crystal and the aluminum salt.

9. The method according to claim 1, wherein calcination is conducted at 600° C. or more.

10. A method for producing an α-alumina powder comprising the steps of:
    (1) pulverizing a metal compound having a full width at half maximum (Ho) of a main peak in XRD pattern to obtain a seed crystal having a full width at half maximum (H) of the main peak in XRD pattern in the presence of pulverizing agent,
    (2) mixing the obtained seed crystal with an aluminum salt,
    (3) calcining the mixture, and
    wherein the ratio of H/Ho is 1.06 or more,
    wherein the metal compound is diaspore.

11. A method for producing an α-alumina powder comprising the steps of:
    (1) pulverizing a metal compound having a full width at half maximum (Ho) of a main peak in XRD pattern to obtain a seed crystal having a full width at half maximum (H) of the main peak in XRD pattern in the presence of pulverizing agent,
    (2) mixing the obtained seed crystal with an aluminum salt, (3) calcining the mixing, and
wherein the ratio of H/Ho is 1.06 or more,
wherein the pulverizing agent is a glycol having a MW of from 50 to 300 and boiling point of from 150° C. to 300° C.

12. A method for producing an α-alumina powder comprising the steps of:
(1) pulverizing a metal compound having a full width at half maximum (Ho) of a main peak in XRD pattern to obtain a seed crystal having a full width at half maximum (H) of the main peak in XRD in the presence of pulverizing agent,
(2) mixing the obtained seed crystal with an aluminum salt,
(3) calcining the mixture, and
wherein the ratio of H/Ho is 1.06 or more,
wherein the pulverizing agent is polypropylene glycol.

* * * * *